United States Patent [19]

Dugan et al.

[11] Patent Number: 5,544,048
[45] Date of Patent: Aug. 6, 1996

[54] METHOD AND APPARATUS FOR MARKING TEXT BETWEEN PAIRED DELIMITERS

[75] Inventors: Pamela A. Dugan, Euless, Tex.; Gregory P. Fitzpatrick, Rochester, Minn.; William J. Johnson, Flower Mound; Marvin L. Williams, Lewisville, both of Tex.

[73] Assignee: International Business Machines, Armonk, N.Y.

[21] Appl. No.: 991,932

[22] Filed: Dec. 17, 1992

[51] Int. Cl.[6] ........................................... G06F 17/30
[52] U.S. Cl. .................. 364/419.17; 395/600; 395/146; 364/DIG. 2; 364/943; 364/943.43
[58] Field of Search .................................... 364/600, 425, 364/419.17; 340/146.2; 395/146

[56] References Cited

U.S. PATENT DOCUMENTS

| | | | |
|---|---|---|---|
| 3,711,863 | 1/1973 | Bloom | 371/19 |
| 5,079,700 | 1/1992 | Lim et al. | 395/700 |
| 5,179,711 | 1/1993 | Vreeland | 395/775 |

FOREIGN PATENT DOCUMENTS

| | | |
|---|---|---|
| 0052754 | 6/1982 | European Pat. Off. . |
| 422784 | 9/1990 | European Pat. Off. . |

OTHER PUBLICATIONS

Borland Quattro Pro for Windows, Ver. 5.0, User's Guide 1993, pp. 111–133.

WordPerfect for DOS / Reference; Version 5.1; pp. 46–49, 434–440.

L. L. Kerr "Printing of Clipboard" Research Disclosure, No. 312, published Apr. 1990.

J. W. Malcolm "Clipboard Format for ASCII Text With Attributes" IBM Technical Disclosure Bulletin, vol. 33, No. 11, pp. 240–241, published Apr., 1991.

G. A. Basar, J. Blevins and C. A. Jones "Clipboard Format for Process Manager" IBM Technical Disclosure Bulletin, vol. 34, No. 1, p. 128, published Jun., 1991.

S. G. Li and T. J. L. Shrader "Strategies for Appending and Replacing List Selections" IBM Technical Disclosure Bulletin, vol. 34, No. 4A, pp. 266–268, published Sep., 1991.

*Primary Examiner*—Paul V. Kulik
*Attorney, Agent, or Firm*—Norman L. Gundel

[57] ABSTRACT

A method and a data processing apparatus are disclosed for marking characters of a character string, which string is resident in the data processing system. The disclosed invention finds, in the string, a first character that matches a character of a predefined set of characters; as a result of finding the first character, identifies a character predefined as paired with the matched character of the predefined set of characters; finds, in the string, a second character that matches the paired character; and marks the characters of the string between the first character and second character.

8 Claims, 5 Drawing Sheets

METHOD AND APPARATUS FOR MARKING TEXT BETWEEN PAIRED DELIMITERS

BACKGROUND OF THE INVENTION

1. Field of the Invention

The present invention relates to the manipulation of information by electronic data processing systems and in particular to electronic data processing systems that mark text strings for subsequent processing.

2. Description of the Related Art

Many data processing system applications provide for the manipulation of marked text by a person, called a user, who is using a data processing system. Specific text may be marked by the user in, for example, a program code listing or a word processing document. This marking of text may also be called clipping, highlighting, capturing, or blocking. Operations may be performed upon the marked text, such as clear, copy, cut, delete, move or paste. These operations may involve a clipboard.

A user may mark a string of text in various ways. In one method, the user may place a cursor or mouse pointer on a character at one end of the text string to be marked, enter a keyboard or mouse command, then move the cursor or pointer to the character at the other end of the text string to be marked and enter another keyboard or mouse command. The first and last characters of the text string may be called start and stop, or open and close, delimiters. The second keyboard or mouse command may optionally initiate an action to be performed upon the marked text string; thus, different second commands may, for example, delete the marked text string or begin a copy or move operation on the marked text string.

Another method of marking a text string includes the placement of the pointer or cursor on the first character of the text string to be, marked, entering a keyboard or mouse command to initiate the marking, and then entering a character, as by the keyboard; in response, the system marks the text string beginning at the cursor or pointer position and ending at the first occurrence of the character selected. Repeated entry of the same character or selection of a different character may expand the marking to the next occurrence of the newly selected character, which entry may also be repeated to further expand the marking. Expansion of the mark may be completed upon entry of a character or command that is incompatible with further expansion of the mark. In this method, the first keyboard or mouse command causes the system to accept the entry of subsequent keyboard characters as commands.

Another method allows the marking of text with a dedicated single command. The user first positions the cursor or pointer at the, first character of the text string to be marked, and then enters a dedicated single command that marks the text string from the pointer or cursor position to the end of a line, the end of a sentence, the end of a paragraph, the end of a page or some other predefined section, as specified by the dedicated single command entered by the user.

Dedicated single commands may be provided that not only mark text from the cursor or pointer position to a predefined end point, but also initiate or perform a predefined operation upon the marked text such a dedicated single command may, for example, delete all text from the location of the cursor or pointer to the end of the line. Other dedicated single commands may similarly delete all text from the cursor or pointer position to the end of the sentence, section, paragraph or page. Similar dedicated single commands may be provided to initiate other clipboard commands, such as move or copy, of the text from the cursor or pointer location to the end of the line, sentence, paragraph or page or other predefined section.

Other commands may be provided to mark or delete the entire sentence in which the cursor or pointer is positioned upon the entry of the single dedicated command. Such a command may mark or delete all text beginning with a capital letter located at or to the left of the cursor or pointer and ending with a punctuation mark located at or to the right of the cursor, such as a period or question mark, and including up to three space after the punctuation mark. Similar dedicated keyboard commands may provide for the deletion of the entire line, section, paragraph or page upon Which the cursor or pointer is located.

These predefined dedicated text string marking commands may eliminate the need to sequentially place the pointer or cursor at both the beginning and the end of the text string to be marked. However, only a limited range of predefined string commands may be provided, as each predefined string requires a separate, specific command. If the number of predefined commands is increased, the advantages of single command operation may be compromised by the need to present multiple menus or enter multiple keystrokes to accommodate the larger number of choices.

A method and apparatus are desired in which a single command may allow a user to mark text between predefined pairs of open and close delimiters and, further, in which the same single command may allow the user to mark text between different predefined pairs of open and close delimiters. A method and apparatus are also desired in which the second delimiter of a text string to be marked may be identified in response to the first delimiter, either as specified by the user or determined by the method or apparatus.

SUMMARY OF THE INVENTION

In accordance with the method and apparatus of the present invention, a method and a data processing apparatus are disclosed for marking characters of a character string, which string is resident in the data processing system. The disclosed invention finds, in the string, a first character that matches a character of a predefined set of characters; as a result of finding the first character, identifies a character predefined as paired with the matched character of the predefined set of characters; finds, in the string, a second character that matches the paired character; and marks the characters of the string between the first character and second character.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
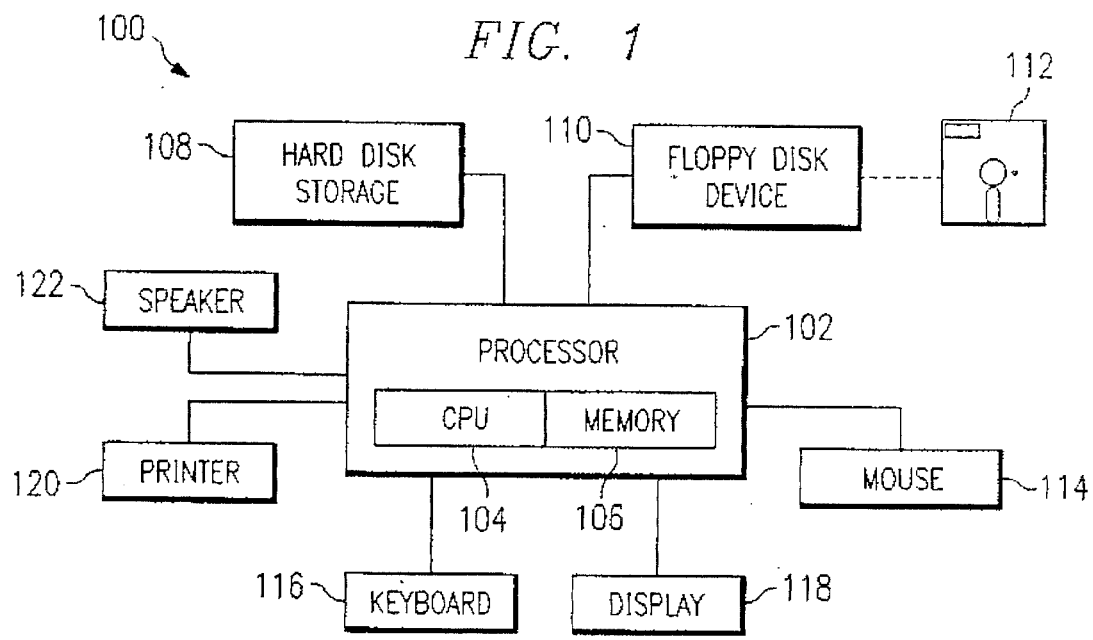
FIG. 1 is a block diagram of a data processing system used in performing the method of a preferred embodiment of the present invention and forming a part of the apparatus of a preferred embodiment of the present invention.

With reference now to the figures, and in particular with reference to FIG. 1, there is shown, in block diagram form, a data processing system 100 according to the present invention. The data processing system 100 includes a processor 102, which includes a central processing unit (CPU) 104 and memory 106. Additional memory, such as a hard disk file storage 108 and a floppy disk device 110, may be connected to the processor 102. Floppy disk device 110 may receive a removable diskette 112 which may have computer program code recorded thereon that implements the present invention in the data processing system 100. The data processing system 100 also includes user interface hardware, such as a mouse 114 and a keyboard 116, for allowing user input to the processor 102. The data processing system 100 also includes a display such as a monochrome or color display monitor 118 and a monochrome or color display printer 120 for presenting visual information to the user. The data processing system may also include a speaker 122 for presenting audio information to the user.

Figure 2:
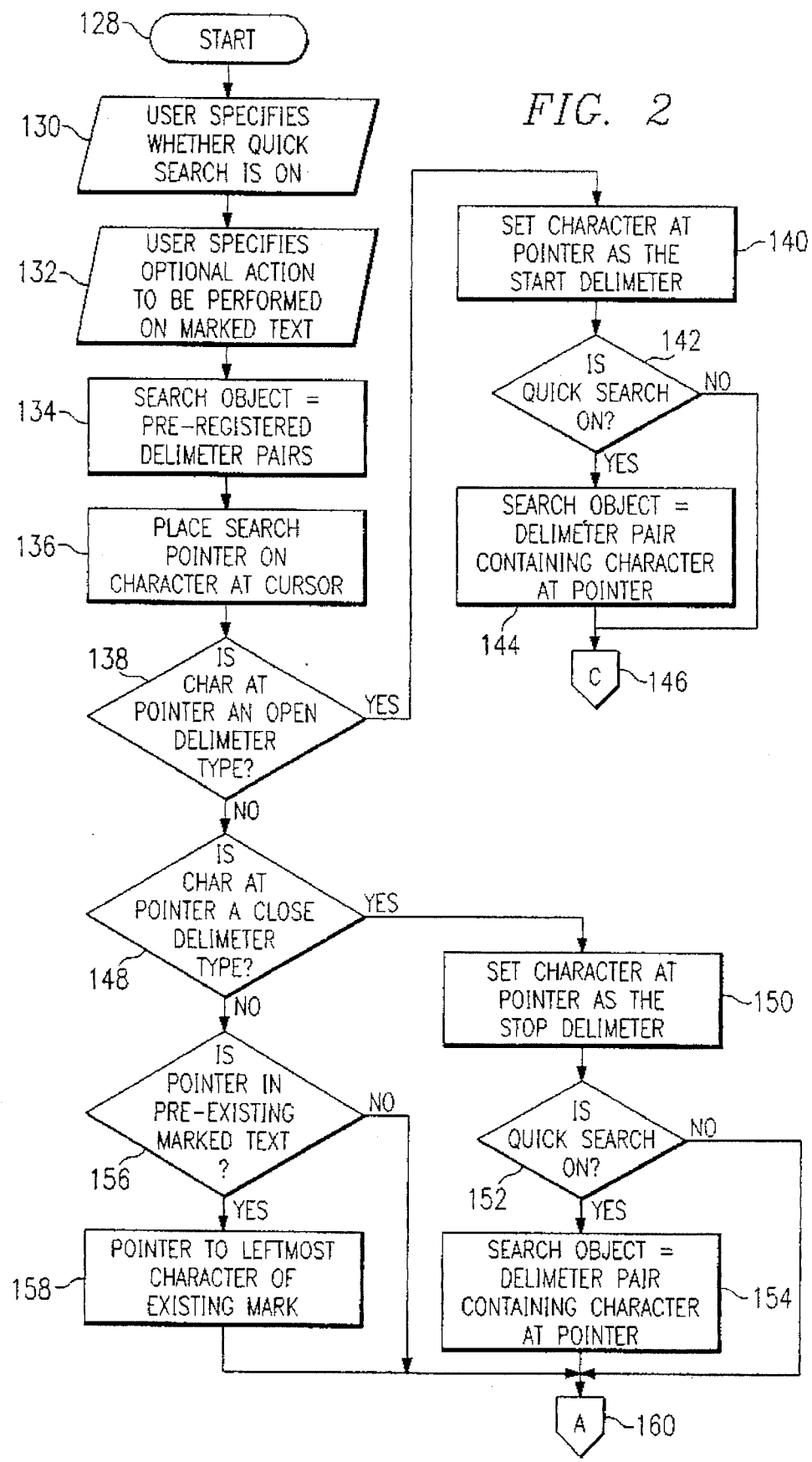
FIGS. 2–6 are a high level logic flow chart illustrating the method of a preferred embodiment of the present invention.

With reference now to FIGS. 2-6 and more particularly to FIG. 2, there is depicted a high level flowchart which illustrates the method of a preferred embodiment of the present invention. The process preferably operates while the data processing system 100 displays text, such as program code or word processing text, to the user. The process starts at block 128. To begin the process, the user positions a cursor at a displayed character of the displayed text. In this description, the term cursor shall also include the indicator or pointer of a pointing device. Optionally, the user may position the cursor on any character within a previously marked text string or on a single, unmarked character. The user then enters a command, as by a single keystroke or mouse, click, to mark text.

The process then proceeds from block 128 to block 130 in Which the user may specify whether standard search mode or quick search mode is desired. Both modes search the text string for any preregistered delimiter until the first delimiter is located. Standard search mode then continues searching for any preregistered delimiter until the second delimiter is found. In quick search mode, once the process has located one of the delimiters of the text to be marked, it focuser its search for the second delimiter on a delimiter that is paired with the first delimiter found. The user may be offered the option of specifying quick search or standard search as a system, session or document default or separately for each search. The user may be offered a choice of quick search or standard search upon initiation of the process, or, alternatively, the user may be provided with two separate initiation commands, one for quick search and the other for standard search.

The process then proceeds from block 130 to 132 in which the user may specify an operation to be executed or initiated upon the marked text immediately upon the completion of the marking. Such operations may include delete, cut, copy, and move. As above, the user may specify an operation as a system or session default or may specify an operation each time a text string is marked, as by selecting from a menu or by initiating the marking with a dedicated command that also includes the desired operation.

The choices offered in blocks 130 and 132 are optional. They may be offered by defaults or by menu choices, or their selection may be integrated into the start command entered in block 128; thus, with a single predefined command, the user may also select among the options offered in blocks 130 and 132.

The process then proceeds from block 132 to block 134 where the process sets preregistered delimiter pairs as the search object. The search object consists of the delimiter pair or pairs of characters that the process will seek matches for in execution. Delimiters are the first and last characters of a text string. Delimiters are preregistered in ordered pairs of an open delimiter and a close delimiter. Delimiter pairs may be predefined by the application or preregistered by the user or both. Examples of possible delimiter pairs include open and close parentheses and left and right brackets. The first delimiter of a registered pair is an open delimiter and the second delimiter is a close delimiter.

The process next proceeds from block 134 to block 136 and focuses the process' search pointer or focus upon the character at the cursor. The process next proceeds to block 138 for a determination of whether the character at the search pointer is preregistered as an open delimiter of any search object delimiter pair. If yes, the process proceeds from block 138 to block 140 and sets the character at the search pointer as the start delimiter. The process next proceeds to block 142 for a determination of whether quick search has been set on in block 130. If yes, the process proceeds from block 142 to block 144 and replaces the existing search, object (set in block 134) with the delimiter pair that contains the character that has been set as the start delimiter. The process then proceeds from block 144 to block 146 and thence to block 230, of FIG. 5 for further processing as described below. Returning to block 142, if the process determines that quick search has not been set on, the process proceeds directly from block 142 to block 146 and thence to block 230 of FIG. 5.

Returning to block 138, if it is determined that the character at the search pointer is not an open delimiter, the process proceeds to block 148 for a determination of whether this character is a close delimiter. If yes, the process proceeds to block 150 and sets the character at the search pointer as the stop delimiter. The process then proceeds to block 152 for a determination of whether quick search has been set on in block 130. If yes, the process proceeds to block 154 and replaces the present search object with the preregistered delimiter pair containing the stop delimiter, in a manner similar to that described in block 144. The process the proceeds from block 154 to block 160 and thence to block 170 of FIG. 3 for further processing. Returning to block 152, if it is determined that quick search has not been set on, the process proceeds from block 152 to block 160 and thence to block 170 of FIG. 3.

Returning to block 148, if the character at the search pointer is not a close delimiter type, the process proceeds from block 148 to optional block-156 for a determination of whether the pointer is in preexisting marked text. If no, the process proceeds from block 156 to block 160 and thence to block 170 of FIG. 3. If yes, the process proceeds from block 156 to optional block 158 and moves the search pointer from the character at the original cursor position to the left most character of the existing marked text. The process then proceeds from block 158 to block 160 and thence to block 170 of FIG. 3. If optional blocks 156 and 158 are not included in the process the process would proceed directly from block 148 to block 160 if the character at the search pointer is not a close delimiter type.

Figure 3:
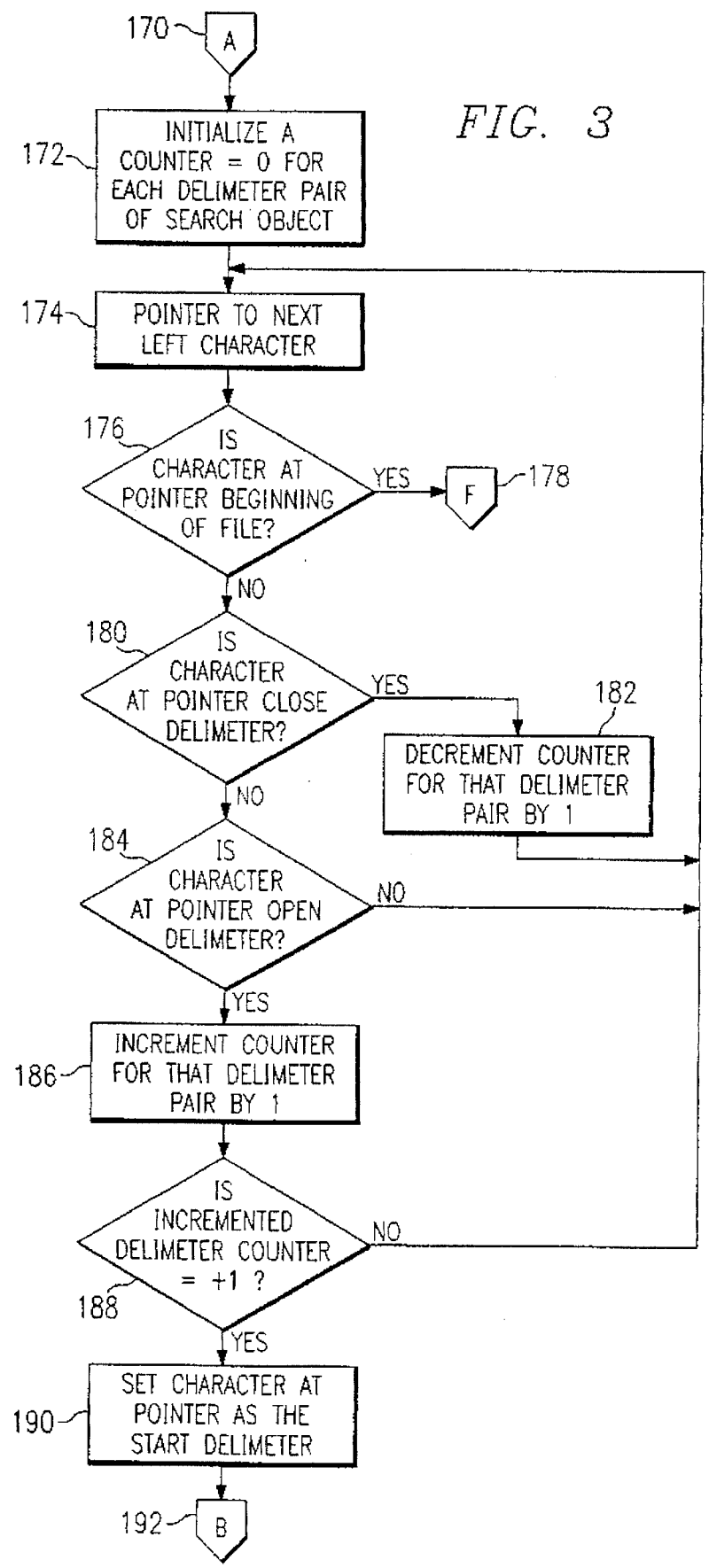

Turning next to FIG. 3, the process proceeds from block 160 of FIG. 2 to block 170 of FIG. 3 and thence to block 172, where counters, one for each delimiter pair of the search object, are established and initialized to zero. The process next proceeds to block 174, in which the search pointer is moved one character to the left. Although the process illustrated, if no delimiter has yet been found, searches first to the left to find a start delimiter, the process can be revised to search first to the right to find a close delimiter. The process then proceeds to block 176 for a determination of whether the character now at the search pointer is a beginning of file mark. If yes, the process proceeds to block 178 and thence to block 274 of FIG. 6, as described below. If the character is not a beginning of file marker, the process proceeds from block 176 to block 180 for a determination of whether the character at the search pointer is a close delimiter of the search object. If yes, the process proceeds to block 182 and decrements by one the counter for the delimiter pair that includes the close delimiter matched in block 180. The process next proceeds from block 182 to block 174 as described above.

Returning to block 180, if the character at the search pointer is not a close delimiter of the search object, the process proceeds to block 184 for a determination of whether the character at the search pointer is an open delimiter of the search object. If no, the process proceeds from block 184 block 174, as described above. If the character at the search pointer is an open delimiter of the search object, the process proceeds from block 184 to block 186 and increments by one the counter for the delimiter pair that includes the open delimiter matched in block 184. The process next proceeds to block 188 for a determination of whether the counter incremented in block 186 is now equal to plus one. If no, the process proceeds from block 188 to block 174 as described above. If the incremented counter is equal to plus one, the process proceeds from block 188 to block 190 and sets the character at the search pointer as the start delimiter. The process then proceeds to block 192 and thence to block 200 of FIG. 4.

Figure 4:
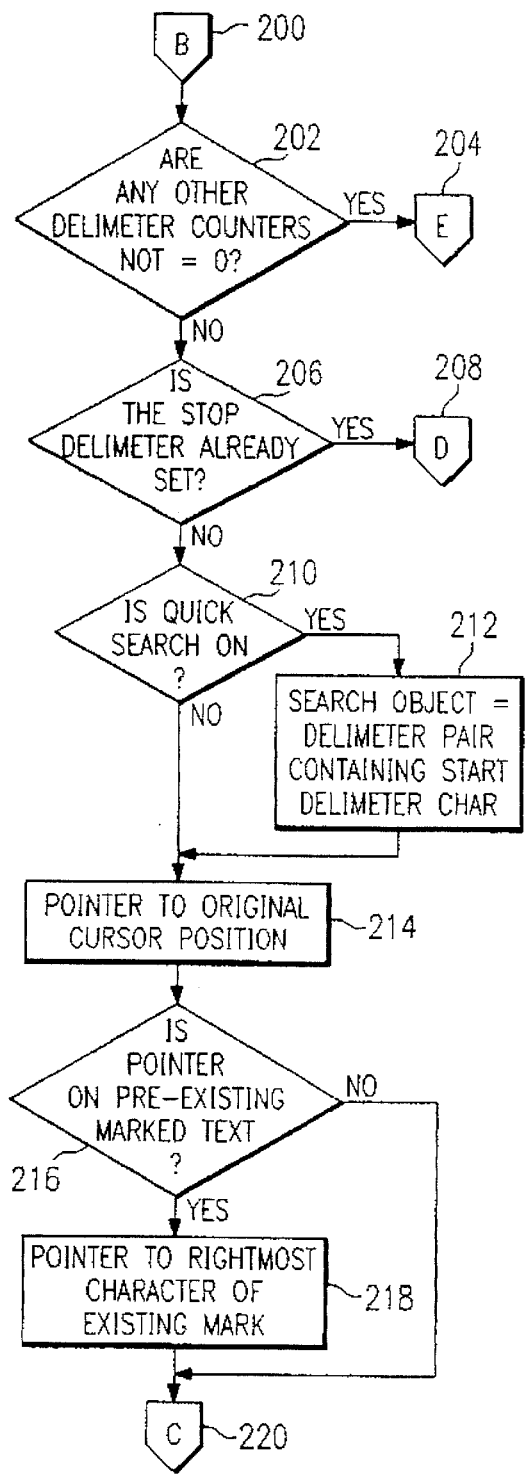

Turning now to FIG. 4, the process proceeds from block 192 of FIG. 3 to block 200 of FIG. 4 and thence to block 202 for a determination of whether any of the delimiter counters are not equal to zero. A nonzero counter indicates that the text being evaluated includes an incorrect, unbalanced delimiter. The counter determined in block 188 above to equal plus one is excluded from this determination. If any of these other counters are determined to be non-zero, the process proceeds from block 202 to block 204 and thence to block 264 of FIG. 6.

Returning to block 202, if none of the other delimiter counters are non-zero, the process proceeds from block 202 to block 206 for a determination of whether the stop delimiter has previously been set in block 150. If yes, the process proceeds from block 206 to block 208 and thence to block 260 in FIG. 6.

Returning to block 206, if it is determined that the stop delimiter has not previously been set, the process proceeds from block 206 to block 210 for a determination of whether quick search has been set on. If yes, the process proceeds from block 210 to block 212 and replaces the search object with the delimiter pair containing the start delimiter character. The process then proceeds from block 212 to block 214. Returning to block 210, if the process determines that quick search has not been set on, the process proceeds from block 210 directly to block 214 and moves the search pointer to the original cursor position at the time the process was started in block 128.

The process next proceeds to optional block 216 for a determination of whether the search pointer is on preexisting marked text. If yes, the process proceeds to optional block 218 and moves the search pointer to the right most character of the preexisting mark and thence proceeds to block 220 and thence to block 230 of FIG. 5. Returning to block 216, if the search pointer is not on preexisting marked text, the process proceeds directly from block 216 to block 220 and thence to block 230 of FIG. 5. If optional blocks 216 and 218 are omitted, the process proceeds from block 214 directly to block 220.

Figure 5:
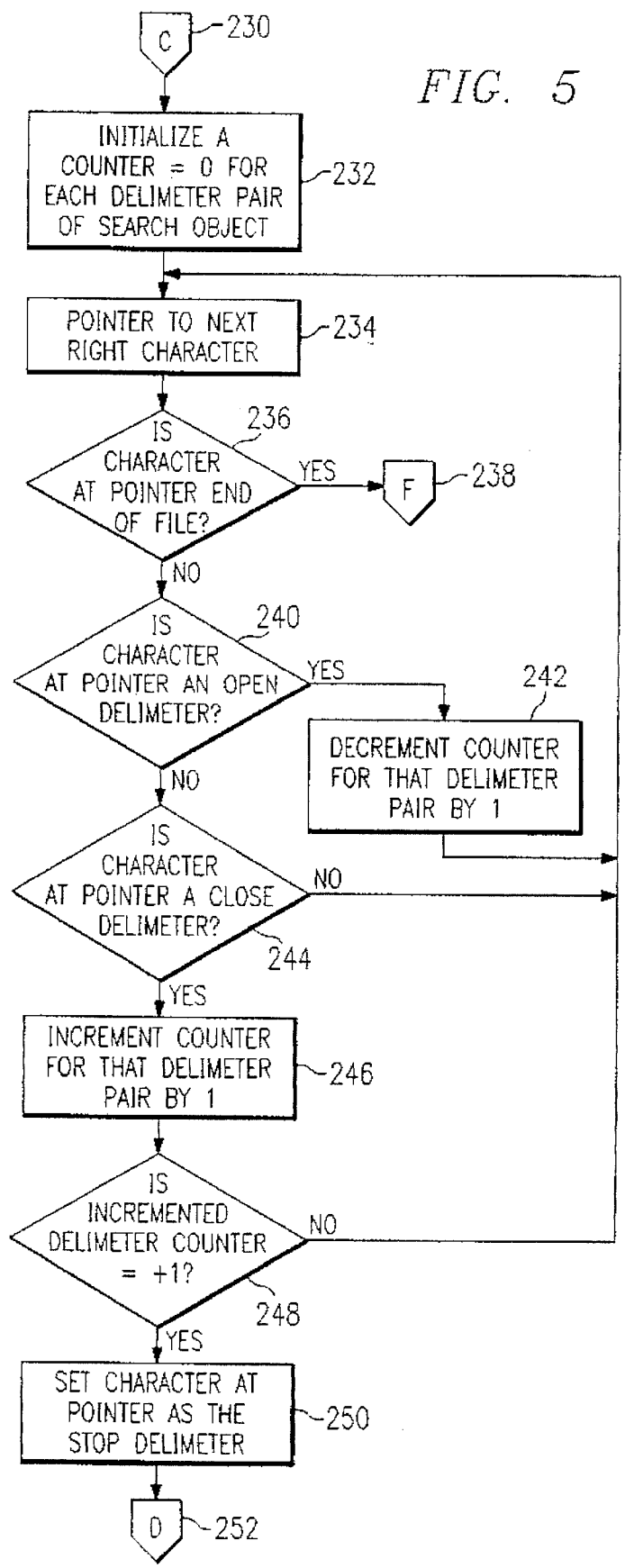

Turning now to FIG. 5, the process proceeds from block 220 of FIG. 4 to block 230 of FIG. 5 and thence to block 232 and initializes to zero a counter for each delimiter pair of the search object. The process next proceeds to block 234 and moves the search pointer one character to the right. The process next proceeds to block 236 for a determination of whether this character is an end of file mark. If yes, the process proceeds to block 238 and thence to block 274 of FIG. 6. If the character at the search pointer is not an end of file mark, the process proceeds from block 236 to block 240 for a determination of whether the character at the search pointer is an open delimiter of a search object delimiter pair. If yes, the process proceeds from block 240 to block 242 and decrements by one the counter for the delimiter pair that includes the open delimiter found. The process next proceeds from block 242 to block 234 as described above.

Returning to block 240, if the character at the search pointer is not an open delimiter of the search object, the process proceeds from block 240 to block 244 for a determination of whether the character is a close delimiter of a search object delimiter pair. If no, the process proceeds from block 244 to block 234 as described above. If yes, the process proceeds from block 244 to block 246 and increments by one the counter for the delimiter pair that includes that close delimiter. The process then proceeds to block 248 for a determination of whether the counter incremented in block 246 is equal to plus one. If no, the process proceeds from block 248 to block 234 as described above. If the counter just incremented is equal to plus one, the process proceeds from block 248 to block 250 and sets the close delimiter character as the stop delimiter. The process then proceeds to block 252 and thence to block 260 of FIG. 6.

Figure 6:
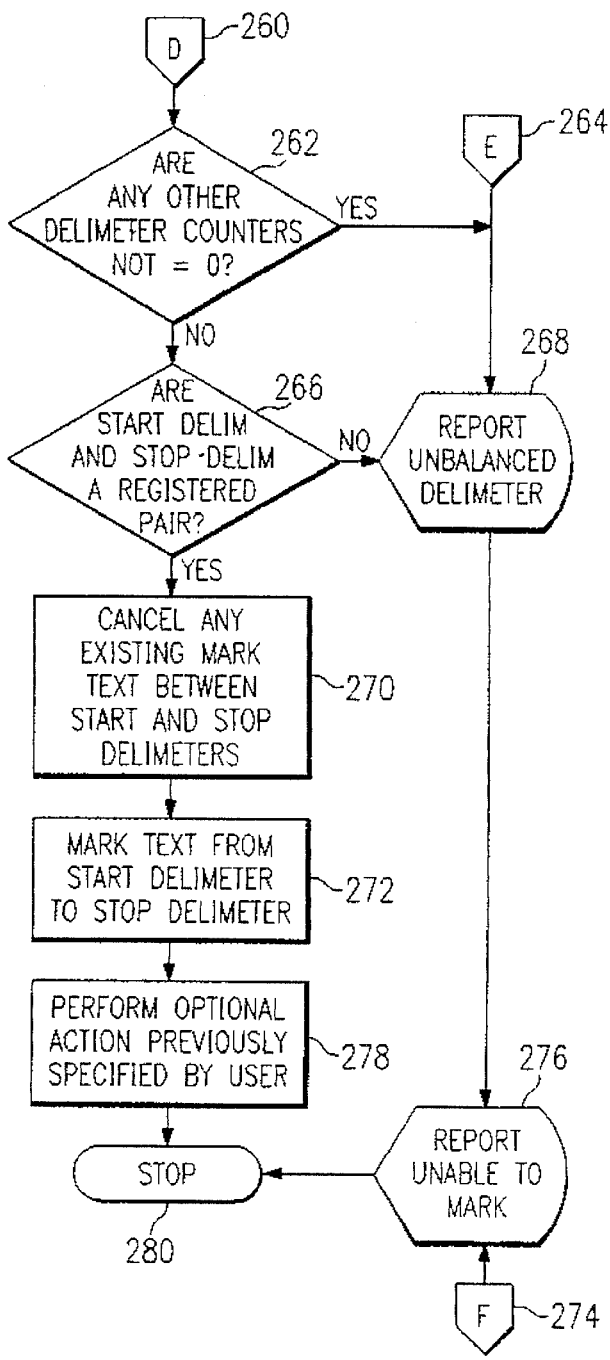

Turning now to FIG. 6, the process proceeds from block 252 of FIG. 5 to block 260 of FIG. 6 and then to block 262 of FIG. 6 for a determination of whether any delimiter counters are not equal to zero. The delimiter counter determined to be equal to plus one in block 248 is not considered in this determination. If yes, the process proceeds from block 262 to block 268 and reports to the user the presence of an unbalanced delimiter. Processes arriving at block 264 from block 204 of FIG. 4 also proceed to block 268 and report the presence of an unbalanced delimiter to the user. From block 268, the process proceeds to block 276, described below.

Returning to block 262, if it is determined that no other delimiter counters are non-zero, the process proceeds from block 262 to block 266 for a determination of whether the start delimiter, set in either block 140 or block 190, and the stop delimiter, set in either block 150 or block 250, are paired as the open delimiter and the close delimiter of the same pair of delimiters of the search object. If no, the process is unable to mark a text string and proceeds from block 266 to block 268 and report the presence of an unbalanced delimiter, and then to block 276 to be described below. If yes, the process proceeds from block 266 to optional block 270 and cancels any existing marking of text located between the start and stop delimiters. The process then proceeds to block 272 and marks the text from the start delimiter to the stop delimiter. Optionally, the process may also apply other marking rules, such as expanding the mark to include up to three spaces after a stop delimiter. The process then proceeds to block 278 and initiates, upon the newly marked text, any operation selected in block 132, such as copy, cut, delete, move, etc. Completion of this operation may require further user input, such as confirm on delete or specifying the destination of a move or copy command. The process then proceeds to block 280 and terminates.

Returning to block 276, the process in block 276 reports to the user that the process is unable to mark text and then proceeds to block 280 and terminates. Similarly, the process arriving at block 274 from either block 178 of FIG. 3 or block 238 of FIG. 5 proceeds from block 274 to block 276, reports to the user that the process is unable to mark text, and proceeds to block 280 and terminates.

Figure 7:
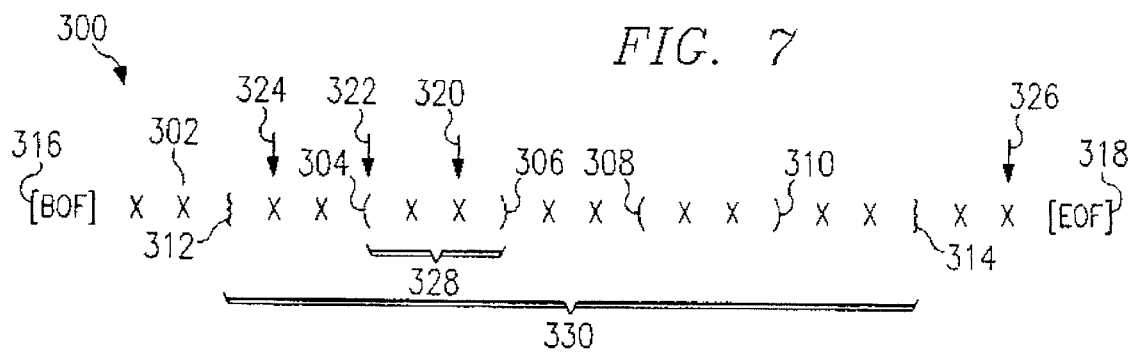
FIG. 7 illustrates the operation of the invention on a string of characters.

Turning now to FIG. 7, operation of the process is illustrated. Assume that two pairs of delimiters are preregistered: open parenthesis "(" as the start delimiter paired with close parenthesis ")" as the close delimiter; and left curly bracket "{" as the start delimiter paired with right curly bracket "}" as the close delimiter. FIG. 7 illustrates a text string 300, which includes x's 302 representing text, two pairs of parenthesis 304, 306 and 308, 310 enclosing text, both enclosed within a pair of curly brackets 312, 314. The text string 300 also includes a beginning-of-file marker 316 and an end-of-file marker 318.

If a user places the cursor at arrow 320 and enters a marking command, the system performing the process will search to the left, locating left parenthesis 304, then search to the right, locating right parenthesis 306, mark them and the text therebetween as shown by bar 328, and terminate. If the marking command is entered while the cursor is at arrow 322, the system will determine that the character at the cursor, left parenthesis 304, is an open delimiter, then search to the right, locating closed parenthesis 306, mark the text above bar 328, and terminate.

If the cursor is at arrow 324 when a mark command is entered, the process will search to the left, locating left curly bracket 312, then search to the right, locating parentheses 304, 306, 308, and 310 until it locates right curly bracket 314, marks the text illustrated by bar 330, and terminate. If quick search is on, the system will not locate the intervening parenthesis, but the same result will be reached.

If a marking command is repeated while the cursor is at arrow 320 after the text above bar 328 has been marked, the process will begin its leftward search from left parenthesis 304, locating curly bracket 312, then begin its rightward search at right parenthesis 306, eventually locating right curly bracket 314, mark the text above bar 330, and terminate.

Finally, if a marking command is entered while the cursor is at point 326, the process will search to the left until it finds the beginning-of-file marker 316, report that it is unable to mark text, and terminate.

Upon reference to the foregoing, it will be appreciated that the applicants have provided a novel and useful method and apparatus for marking text. While the invention has been particularly shown and described with reference to a preferred embodiment and process, it will be understood that various changes in form and detail may be made therein without departing from the spirit and scope of the invention.

What is claimed is:

1. A method, performed in a data processing system, of marking characters of a character string, which string is resident in the data processing system, the method comprising the computer implemented steps of:

positioning a search focus on a character of the string in response to user input, wherein the character of the string at the search focus is the first character;

determining that the first character matches a character of a predefined set of characters;

as a result of finding that the first character matches a character of the predefined set of characters, identifying a character predefined as paired with the matched character of the predefined set of characters;

as a result of the identity of the matched character of the predefined set of characters, determining a search direction;

searching in the search direction for additional occurrences of the matched character found and for occurrences of the paired character found, counting the number of additional occurrences of the matched character found and separately counting the number of occurrences of the paired character found, until a second character is found, said second character being the paired character that causes the number of occurrences of the paired character found to exceed by one the number of additional occurrences of the matched character found; and marking the characters of the string between the first character and second character.

2. The method of claim 1, further comprising the computer implemented step of automatically performing an action on the marked text.

3. A data processing system for marking characters of a character string, which string is resident in the data processing system, comprising:

means for positioning a search focus on a character of the string in response to user input, wherein the character of the string at the search focus is the first character;

means for determining that the first character matches a character of a predefined set of characters;

means for identifying, as a result of finding that the first character matches a character of the predefined set of characters, a character predefined as paired with the matched character of the predefined set of characters;

means for determining, as a result of the identity of the matched character of the predefined set of characters, a search direction;

means for searching in the search direction for additional occurrences of the matched character found and for occurrences of the paired character found, counting the number of additional occurrences of the matched character found and separately counting the number of occurrences of the paired character found, until a second character is found, said second character being the paired character that causes the number of occurrences of the paired character found to exceed by one the number of additional occurrences of the matched character found; and means for marking the characters of the string between the first character and second character.

4. The data processing system of claim 3, further comprising means for automatically performing an action on the marked text.

5. A method, performed in a data processing system, of marking additional characters surrounding a previously marked group of characters of a character string, which character string is resident in the data processing system, the method comprising the computer implemented steps of:

comparing adjacent characters of the character string to characters of a predefined set of characters, beginning with a character at a first end of the previously marked group of characters and proceeding in the direction away from the previously marked group of characters, until a first character of the character string that matches a character of the predefined set is found;

as a result of finding the first character, identifying a character predefined as paired with the matched character of the predefined set of characters;

comparing adjacent characters of the character string to characters of the predefined set of characters, beginning with a character at the end of the previously marked group of characters opposite the first end and proceeding in the direction away from the previously marked group of characters, and counting the number of additional occurrences of the matched character found and separately counting the number of occurrences of the paired character found, until a second character of the character string is found that causes the number of occurrences of the paired character found to exceed by one the number of additional occurrences of the matched character found; and marking the characters of the character string between the first character and second character.

6. A method, performed in a data processing system, of marking characters of a character string, which string is resident in the data processing system, the method comprising the computer implemented steps of:

finding, in the string, a first character that matches a character of a predefined set of characters;

as a result of finding the first character, identifying a character predefined as paired with the matched character of the predefined set of characters;

searching adjacent characters of the character string for additional occurrences of the matched character found and for occurrences of the paired character found, counting the number of additional occurrences of the matched character found and separately counting the number of occurrences of the paired character found, until a second character is found in the character string, said second character being the character that causes the number of occurrences of the paired character found to exceed by one the number of additional occurrences of the matched character found; and marking the characters of the character string between the first character and the second character.

7. A data processing system for marking additional characters surrounding a previously marked group of characters of a character string, which character string is resident in the data processing system, comprising:

means for comparing adjacent characters of a character string to characters of the predefined set of characters, beginning with a character at a first end of the previously marked group of characters, and proceeding in the direction away from the previously marked group of characters, until a first character of the character string that matches a character of the predefined set is found;

means for identifying, as a result of finding the first character, a character predefined as paired with the matched character of the predefined set of characters;

means for comparing adjacent characters of the character string to characters of the predefined set of characters, beginning with a character at the end of the previously marked group of characters opposite the first end and proceeding in the direction away from the previously marked group of characters, and separately counting the number of occurrences of the paired character found, until a second character of the character string is found that causes the number of occurrences of the paired character found to exceed by one the number of additional occurrences of the matched character found; and means for marking the characters of the character string between the first character and second character.

8. A data processing system for marking characters of a character string, which string is resident in the data processing system, comprising:

means for finding, in the string, a first character that matches a character of a predefined set of characters;

means for identifying, as a result of finding the first character, a character predefined as paired with the matched character of the predefined set of characters;

means for searching adjacent characters of the character string for additional occurrences of the matched character found and for occurrences of the paired character found, counting the number of additional occurrences of the matched character found and separately counting the number of occurrences of the paired character found, until a second character is found in the character string, said second character being the character that causes the number of occurrences of the paired character found to exceed by one the number of additional occurrences of the matched character found; and means for marking the characters of the character string between the first character and the second character.

\* \* \* \* \*